United States Patent [19]

Farnsworth

[11] Patent Number: 4,478,708

[45] Date of Patent: Oct. 23, 1984

[54] METHOD AND APPARATUS FOR SEPARATING FLUIDIZED SOLID PARTICLES SUSPENDED IN GASIFORM MATERIAL

[76] Inventor: Carl D. Farnsworth, 2401 Sedley Rd., Charlotte, N.C. 28211

[21] Appl. No.: 540,359

[22] Filed: Oct. 11, 1983

[51] Int. Cl.$^3$ .................. C10G 11/18; F27B 1/20
[52] U.S. Cl. .................. 208/161; 208/164; 208/127; 208/120; 422/147; 55/1; 55/342
[58] Field of Search ............... 422/147, 144; 208/113, 208/120, 161, 164, 153, 127; 55/1, 342

[56] References Cited

U.S. PATENT DOCUMENTS

| | | | |
|---|---|---|---|
| 2,654,699 | 10/1953 | Lesher | 208/161 |
| 3,123,547 | 3/1964 | Palmer et al. | 208/78 |
| 3,406,112 | 10/1968 | Bowles | 208/153 |
| 3,785,962 | 1/1974 | Conner et al. | 208/164 |
| 3,898,050 | 8/1975 | Strother | 208/164 |
| 4,035,284 | 7/1977 | Gross et al. | 208/120 |
| 4,219,407 | 8/1980 | Haddad et al. | 208/151 |
| 4,295,961 | 10/1981 | Fahrig et al. | 208/161 |
| 4,310,489 | 1/1982 | Fahrig et al. | 422/110 |
| 4,313,910 | 2/1982 | Dues et al. | 422/147 |
| 4,387,043 | 6/1983 | Vickers et al. | 208/164 |
| 4,397,738 | 8/1983 | Kemp | 208/161 |
| 4,404,095 | 9/1983 | Haddad et al. | 208/161 |

Primary Examiner—Delbert E. Gantz
Assistant Examiner—O. Chaudhuri
Attorney, Agent, or Firm—Carl D. Farnsworth

[57] ABSTRACT

The method and means of this invention comprises discharging a suspension of solids (inert or catalytic) in gasiform material (whether hydrocarbon vapors, combustion product flue gases, stripping gases or combinations thereof) from a riser contact zone through a plurality of radiating confined passageway emanating from the upper discharge periphery of the riser each of which is in tangential communication at the outer end of the confined passageway with a cylinder open in the bottom end thereof. The cylinder is closed at the top except for a coaxially aligned conduit of smaller diameter extending downwardly through said cylinder with its bottom open end terminating adjacent a lower portion of the inlet of the confined passageway.

14 Claims, 3 Drawing Figures

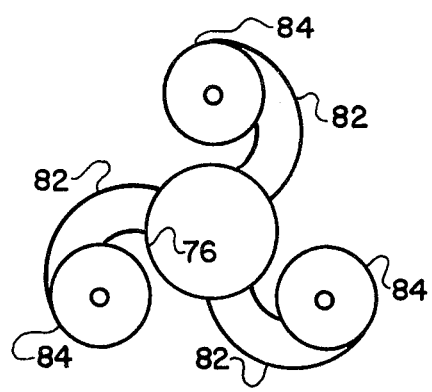
FIG. III
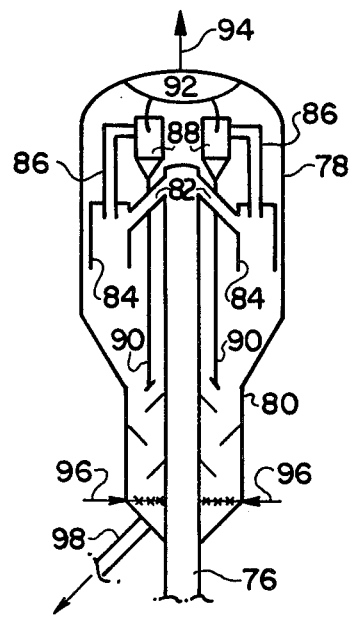
FIG. II

METHOD AND APPARATUS FOR SEPARATING FLUIDIZED SOLID PARTICLES SUSPENDED IN GASIFORM MATERIAL

BACKGROUND OF THE INVENTION

1. Field of the Invention

This invention relates to fluid solids systems involving the transport of fluidizable solid particle material in gasiform material as a suspension and affecting rapid separation thereof upon discharge from the transport zone.

2. Description of The Prior Art

The transport of fluidizable particle material from one zone to another as a suspension in gasiform material has been used for a great many years in many different industries. It has been particularly usefull in systems involving the upgrading of hydrocarbons and regeneration of solids, whether catalytic or inert, and used in hydrocarbon upgrading systems.

With the advent of high activity zeolite cracking catalyst for effecting upgrading of hydrocarbon feed by catalytic cracking it has become essential, to minimize overcracking, to effect the cracking operation in a riser contact zone or other form of restricted diameter transport zone providing and/or permitting control over the residence contact time therein between hydrocarbons and solids in the range of 0.5 up to about 10 seconds, but more usually less than about 3 or 4 seconds. During such a hydrocarbon upgrading operation, hydrocarbonaceous material, more often referred to as carbonaceous material or simply as coke, is deposited on the solid particle material. To restore the usefullness of the solid particle material, the deposited carbonaceous material is removed by combustion with oxygen containing gaseous material such as air, air enriched with oxygen and combustion product flue gases comprising or enriched with oxygen. Thus, it is imperative in any of these riser or confined transport operations to separate the suspension passed therethrough substantially immediately upon discharge therefrom. The urgency of rapidity of separation is particularly concerned when upgrading hydrocarbon feeds so that conversion thereof does not proceed beyond desired limits.

In the prior art hydrocarbon conversion systems, separation of the solid particle material from suspending gasiform material is most usually accomplished within a so called disengaging chamber or zone. The riser of transport zone may discharge within the disengaging chamber in coaxial alignment therewith or more than one riser contact zone may be discharged therein but displaced from coaxial alignment therewith. In a single riser system such as disclosed in U.S. Pat. No. 4,332,674 the disengaging chamber is a long cylindrical chamber of restricted diameter dimension to restrain any substantial accumulation of separated solid particle material therein.

Palmer etal U.S. Pat. No. 3,123,547 discloses as expanding riser tube of more restricted dimension at it's discharge end, discharging through slots in the wall of riser into a relatively large diameter disengaging vessel provided with cyclone separating means. The riser of this patent provides an annular stripping zone down through which separated solids are passed countercurrent to stripping gas charged to a bottom portion thereof.

Bowles U.S. Pat. No. 3,406,112 discloses an apparatus combination of coaxially aligned vessel comprising a lower regeneration vessel, an upper disengaging vessel, an annular stripping zone and a riser reaction zone extending from a bottom portion of said regeneration vessel or chamber upwardly for discharge from the top open end thereof into the disengaging vessel and above the annular stripping zone.

Haddad et al. U.S. Pat. No. 4,219,407 discloses a riser reactor arrangement discharging into a disengaging zone from radially extending arms representing inverted channels open on the bottom side thereof and curving downward at the outer extremity thereof. The solids thus separated from gasiform material is passed downwardly through restricted solids stripping zones before withdrawal from a bottom portion of the vessel. Gasiform material is withdrawn through cyclone separating means in the upper portion of the disengaging vessel.

Vermilion Jr. U.S. Pat. No. 4,064,038 discloses a side by side riser reactor-riser regeneration system wherein the suspension discharged from each riser is passed through an opening in the riser periphery by a confined passageway directly into a cyclone separation zone.

Heffley et al U.S. Pat. No. 4,173,527 discloses a riser system discharging after centrifugally spinning the rising suspension by stator blades into a larger diameter zone comprising a gasiform material outlet pipe of smaller diameter coaxially aligned with and above the riser outlet. The upflowing suspension separated substantially by the stator blades caused the concentration of catalyst particles to pass through an annular zone defined by the distance between the wall of the riser and the wall of the coaxially aligned gasiform material outlet conduit or pipe.

Gross et al U.S. Pat. No. 4,035,284 discloses a side by side hydrocarbon conversion-catalyst regeneration operation employing riser contact zone discharging against plates positioned above the upper open end of the riser contact zones and the use of cyclone separation zones to recover separated gasiform material.

In all of the systems above identified, rapid and efficient separation of a discharged suspension is not necessarily achieved either because the separation arrangement does not provide for high efficiency, cyclone separation equipment are employed under less than the most efficient conditions and/or the disengaging zone becomes filled with many stages of cyclone separation in parallel and sequential arrangement requiring a large disengaging vessel. Thus, these prior art systems are both inefficient and uneconomical for use in modern day low solid particle inventory contact systems. The present invention is therefore concerned with improving upon the separating facilities of the prior art and particularly with improving the efficiency and economics of the separation system by simplifying the system and reducing use of expensive cyclone separating equipment.

SUMMARY OF THE INVENTION

In accordance with the present invention improved method and means are provided for separating solid particle material-gasiform material suspensions discharged from a transport zone. More particularly the present invention is concerned with separating suspensions of hydrocarbon conversion product and combustion gases from solid particle discharged from riser contact zones whereby the separation efficiency is improved in a more economical fashion contributed by reducing the hardware required and fabrication thereof with expensive heat withstanding metal alloys.

The method and means of this invention comprises discharging a suspension of solids (inert or catalytic) in gasiform material (whether hydrocarbon vapors, combustion product flue gases, stripping gases or combinations thereof) from a riser contact zone through a plurality of radiating confined passageway emanating from the upper discharge periphery of the riser each of which is in tangential communication at the outer end of the confined passageway with a cylinder open in the bottom end thereof. The cylinder is closed at the top except for a coaxially aligned conduit of smaller diameter extending downwardly through said cylinder with its bottom open end terminating adjacent a lower portion of the inlet of the confined passageway. The coaxially aligned conduit is provided for withdrawing gasiform material separated from solids by centrifugal separation. The withdrawn gasiform material may then be passed to a cyclone separation zone located within the disengaging vessel about the riser inlet or to a cyclone located outside the disengaging vessel. It is desirable to locate the cyclone separation zone outside a disengaging zone collecting separated regenerated catalyst since such permits the use of refractory lined carbon steel rather than expensive alloys. Location of the cyclone outside the hydrocarboncatalyst disengaging zone may be used to advantage since the method and means of the invention permits reducing the size of the disengaging zone in height and diameter. This contributes to reducing the economics of a grass-roots structure in many different ways associated with providing required metal appendages for strength and hanging required internals.

The radiating confined passageway in open communication with the discharge end of a riser contact zone above briefly discussed may be cylindrical, rectangular, square or obround. This confined passageway may also be straight or curved to initiate some centrifugal momentum to the suspension passed therethrough before tangential inlet to the cylindrical zone with a bottom open end. In addition, the confined passageway may be generally horizontal or downwardly sloping and the cross-sectional area of two or more passageways is at least equal to the riser cross sectional area but preferably is greater than the riser cross sectional area to particularly optimize suspension flow therethrough promoting desired rapid separation of centrifugally separated materials in the cylindrical zone as herein provided. It is preferred that the velocity of the suspension passed through the confined passageway be sufficiently high to achieve desired high efficiency centrifugal separation of solids from gasiform material so that the gasiform material may be more completely separated and recovered in the absence of substantial solid fines entrainment. Employing more than two confined passageways, such as, three, four or more thereof are sized to provide a combined discharge cross-sectional area equal to or greater than the riser cross-sectional area whereby the velocity of the suspension may be optimized to a high level of at least 70 ft/sec. and particularly optimize centrifugal separation of the suspension within the cylindrical zone open in the botton end thereof. It is comtemplated in yet another aspect of modifying the riser adjacent the discharge end thereof to effect a desired change of the suspension velocity passed therethrough before passage through the radiating confined passageways.

BRIEF DESCRIPTION OF THE DRAWINGS

FIG. I is a diagrammatic sketch in elevation of one arrangement of apparatus for converting hydrocarbons in the presence of fluidizable solid particle material and regeneration thereof in riser type contact zones provided with the suspension separating technique of this invention.

FIG.II is a diagrammatic sketch in elevation of a riser contact zone and a suspension separation system which incorporates downwardly sloping discharge confined passageways from the riser.

Figure 1:
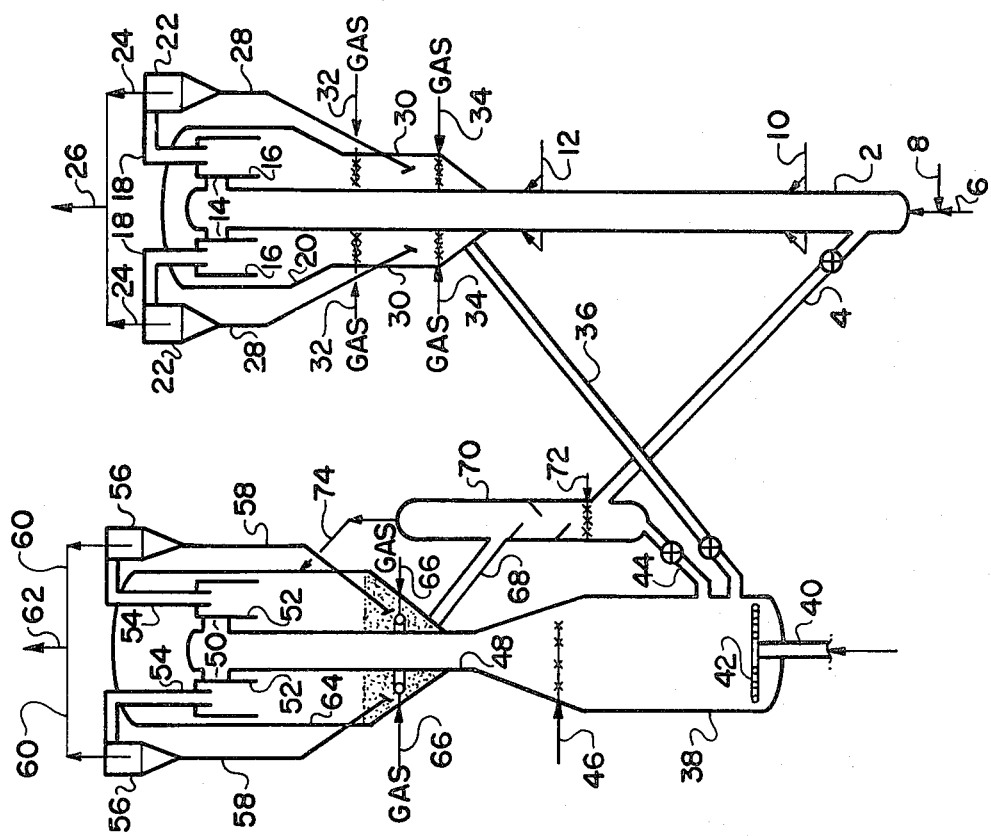

FIG. III is a top view of one embodiment of the separation system of the invention showing the use of curved discharge passageways emanating from the riser and with each tangentially communicating with a cylinder separation zone open in the bottom and providing centrifugal separation of a suspension passed thereto.

DISCUSSION OF SPECIFIC EMBODIMENT

Hydrocarbon feeds which may be processed by this invention include petroleum fractions boiling above gasoline and providing an initial boiling point as low as about 400° F. More particularly the oil feed is a gas oil feed, a residual oil, a topped crude oil, a reduced crude or a heavy oil feed comprising gas oils providing an end boiling point equal to or in excess of 1050° F. Materials boiling above 1050° F. are normally associated with vacuum resids and conradson carbon producing materials which include polycyclic aromatics, asphaltenes and metal contaminants of nickel, vanadium, iron, copper and alkaline metal contaminants.

The above recited broad range of oil feeds will at least contain light gas oils boiling from 400° to 700° F.; medium gas oils boiling from 600° to 850° F.; a mixture of gas oils boiling from 600° F. up to about 1050° or 1100° F. and as desired component materials boiling above 1100° F. normally associated with vacuum tower bottoms. It is contemplated employing any one of the above identified petroleum oil feeds in the systems defined below. Oil products of coal processing and shale may also be upgraded in the systems of the invention either alone or in the presence of a crude oil fraction above identified.

The processing of the oil feed may be accomplished under essentially thermal visbreaking conditions with catalytically inert solid particles or under catalytic cracking conditions with a crystalline zeolite catalyst either with or without the presence of a viscosity reducing material such as naphtha, molecular hydrogen or a hydrogen donor material identified in the prior art. That is, the hydrogen donor material may be a dry gas or wet gas product of petroleum refining comprising hydrogen and/or gaseous hydrocarbons comprising $C_5$ and lower boiling component. Lower boiling alcohols and particularly methanol and ethanol may also be employed. These materials are generally referred to as carbon-hydrogen fragment contributors.

The method and systems of the invention are particularly identified with the thermal and catalytic cracking of hydrocarbons with associated solid particle regeneration operations in the presence of fluidizable solid inert particles, amorphous cracking activity particles, crystalline zeolite cracking activity particles and combinations thereof. That is a crystalline zeolite in an amount within the range of 10 to 60 weight percent or higher may be distributed in a matrix material composition of one or more organic oxides contributing substantial or no catalytic cracking activity. The crystalline zeolite employed may be a large or small pore zeolite or a combination thereof. For example an ultra stable hydrogen "Y" faujasite crystalline zeolite or a rare earth exchanged crystalline zeolite particularly comprising cerium and lanthanum and known in the art as CREY or RECREY or combinations thereof may be used.

There are several important operating parameters which require consideration in any fluid thermal visbreaking and catalytic cracking systems. A most important operating parameter is to ensure that the oil feed achieves substantially intimate flash contact such as a substantially complete atomization-vaporization of the oil feed components upon contact with hot solid particles. The severity of operation for achieving this result varies with the boiling range of the oil feed to be cracked. Thus, a gas oil restricted feed may require more or less severe conditions depending on product desired than a residual oil feed comprising components boiling above 1050° F. and depending on product desired. U.S. Pat. No. 4,332,674 particularly addresses this problem when processing heavy residual oil or reduced crude feeds. To optimize conversion of the feed, it is recognized at this stage of the art that the mix temperature of catalyst and oil feed should be at least equal to the pseudo-critical temperature of the feed charged.

Some operating variable essential to achieving desired conversion of a hydrocarbon feed includes the selection of a feed preheat temperature, selecting the temperature of regenerated catalyst and ratio thereof mixed with the oil feed, the selection of a volume of diluent and composition thereof mixed with the oil feed to achieve desired atomization thereof, and the selection of a suitable unit operating pressure. Other desired operating parameters are related to the uniformity of the suspension temperature selected to be maintained in a reactor riser cross section, the use of a multi-feed injection system for optimizing dispersion of atomized oil feed, employing a riser suspension velocity within the range of 50 to 150 ft/sec, providing duration of hydrocarbon vapor contact with solid particles in the riser reaction zone within the range of 0.5 to 5 seconds and more usually less than 2 or 3 seconds, and more particularly providing an arrangement of means for achieving a rapid and clean separation of the suspension following traverse of the riser reaction zone. Such a predetermined and selected period of contact time between solids and reactant is selected which will particularly optimize the yield of desired conversion products.

The present invention is particularly concerned with the separation of suspensions discharged from a riser contact zone with a high degree of efficiency in a minimum of equipment suitable for the purpose and acceptable to the temperatures encountered. That is, it is contemplated separating a suspension discharged from a riser hydrocarbon conversion zone at a discharge temperature within the range of about 900° F. up to about 1200° F. and more usually below 1100° F. On the other hand, it is contemplated separating a suspension discharged from a riser regeneration zone at a temperature within the range of about 1100° F. up to about 1600° F. or higher but more usually within the range of 1200° F. up to about 1400° F. or 1500° F. Suspensions separated from a riser stripping zone may be at a temperature within the range of 900° to 1400° F.

Thus, within the operating constraints above recited it is desired to achieve conversion of the oil feed to gasoline boiling range product of at least 60 vol. % and preferably at least 70 vol. %. It is also desired to maintain residual coke on regenerated solids below 0.1 wt. % and particularly below 0.05 wt. % on regenerated catalyst solids used to convert gas oils and higher boiling portions of crude oils. Regeneration of the catalyst may be accomplished in a dual regeneration system suitable for the purpose and disclosed in the prior art or specifically disclosed in U.S. Pat. Nos. 4,332,674, 4,336,160, 4,064,038 and variations thereof providing for separate stages of dense or dispersed phase contact and combinations thereof in fluid catalyst regeneration. Combinations of riser regeneration, separate dense fluid solids bed regeneration, fast solids flow regeneration techniques employing riser configurations of larger diameter in a bottom portion than in an upper discharge end portion thereof and combinations of the above regeneration arrangements may be used.

Referring now to FIG. I by way of example there is shown a side by side system for riser hydrocarbon conversion in combination with a type of fast flow riser regeneration of solids circulated in the system. In this arrangement, a riserreaction or hydrocarbon conversion zone 2 is charged with hot regenerated solids by a conduit 4. A fluidizing gaseous or gasiform material is charged to the bottom of riser 2 by conduit 6 to form an upflowing suspension with charged solids. A hydrocarbon feed such as poor quality naphtha or other light diluent material may be charged alone to form a rising suspension or catalytic upgrading by conduit 8 to the bottom of the riser or in admixture with gaseous material charged by conduit 6. A higher boiling gas oil feed may be charged by conduit 8 and admixture with gaseous material in conduit 6 to form a highly atomized mixture for contact with charged catalyst to form an upflowing suspension. On the other hand, the oil feed to be upgraded may be charged by feed inlet means 10 or 12 by an arrangement providing a highly atomized oil feed for contact with a rising suspension of solid particle material in fluidizing gas at a temperature sufficient to achieve desired conversion of the charged oil feed. Generally the temperature of the formed suspension will be sufficient to provide the required endothermic heat of conversion and provide a product vaporcatalyst suspension outlet temperature within the range of about 950° to 1150° F. and more usually not above about 1050° F.

In accordance with the concepts of this invention, the top of a riser contact zone is capped and provided with a plurality of open ended radially extending confined passageways 14. The number of confined passageways used is selected to provide at least the equivalent of the cross sectional area of the riser and preferably greater than the riser cross sectional area to avoid restricting a desired suspension flow velocity from the riser. The suspension passed through the confined passageway 14 discharges tangentially into a cylinder 16 open in the bottom end portion thereof. The cylinder is of a size and employed under conditions providing for centrifugal separation and substantial compaction of solids from vaporous material whereby the vaporous material flows into an internal region of accumulated material for withdrawal as by open end conduit 18 coaxially aligned within cylinder 16. The centrifugally separated solids fall by gravity from the bottom open end of cylinder 16 for collection in a lower annular stripping zone wherein the catalyst is stripped as discussed below. Stripping gas and stripped vaporous products of hydrocarbon conversion separated from catalyst particles falling from the open bottom of the cylinder zone 16 pass upwardly through a central open portion thereof for withdrawal by conduit 18. The vaporous product of conversion and stripping gas withdrawn by conduit 18 with some entrained catalyst fines is passed to a cyclone separation zone 22 shown located outside of vessel 20. In cyclone 22, the fines are separated substantially from vaporous materials and returned by dipleg 28 to the catalyst in the annular stripping zone. Cyclone 22 may be located within zone or vessel 20 with a second stage thereof located outside of vessel 22. On the other hand two sequential stages of cyclone separation may be located within or outside of vessel 20. Vaporous material separated by cyclones 22 are recovered and may be passed directly by conduit 24 and 26 for passage to a product fractionation zone not shown. In the combination cracking operation above discussed it is contemplated charging a light and/or heavy cycle oil product of cracking to a lower portion of riser 2 by either conduit 8 or 10 and charging the fresh gas oil feed to an upper portion of the riser as by conduit 12. On the other hand the light cycle oil, the fresh oil feed and the heavy cycle oil may be charged as a combined stream to the lower or intermediate portion of the riser or separately thereto with the heavy cycle oil charged adjacent a bottom portion of the riser and the fresh oil feed to a downstream portion of the riser.

The catalyst particles separated from the suspension as above described and collected in an annular stripping zone 30 is contacted in one embodiment in an upper portion thereof with a stripping gas such as steam, $CO_2$ or a combination thereof introduced by conduit 32 under velocity conditions inhibiting the entrainment of solids into the bottom open end of cylinder 16. The partially stripped catalyst solids flow downwardly over baffles not shown and counter-current to a second stripping gas stream introduced to a lower portion of the stripping zone by conduit 34. It is contemplated charging a stripping gas to the lower portion of the stripping zone by conduit 34 which is of a higher temperature than the gas charged by conduit 32. Thus, it is contemplated charging process produced steam by conduit 32 and higher temperature $CO_2$ rich flue gas and/or steam by conduit 34 to a lower portion of the stripping zone providing a stripping temperature above 1000° F. and up to as high as about 1400° or 1500° F.

During conversion upgrading of the charged oil feed, the solids, whether inert or catalytic, become coated with hydrocarbonaceous deposits referred to as carbonaceous deposits or simply as coke to provide solids referred to as spent solids. The spent solids are passed from a bottom portion of the stripping zone by a conduit 36 to the lower portion of a solids regeneration zone 38.

The solids regeneration zone 38 shown in FIG. 1 is referred to as a fast flow regeneration operation. In this arrangement a relatively dense fluid mass of solids of a particle concentration within the range of 20 to 35 lbs/cu.ft. is first formed for contact with an oxygen containing regeneration gas charged with or without preheat by conduit 40 to distributor 42 to form a generally upflowing mass of solids undergoing regeneration. Regenerated solids obtained as herein after described may also be charged to the regenerator by conduit 44 for admixture with the spent solids charged by conduit 36. The mixture of spent and regenerated solids charged to the regenerator lower portion are preferably in a ratio selected to achieve rapid ignition burning of charged carbonaceous material with oxygen containing gas and form an upflowing suspension thereof which passes from the lower portion of the regeneration zone upwardly through a more restricted diameter portion 48 resembling a riser contact zone wherein the concentration of solid particles in combustion flue gases is normally less than 20 lbs/cu.ft.. This transition may be gradual or rather abrupt depending on the apparatus design. Additional combustion supporting oxygen containing gas may be charged to the fast flow regenerator system by conduit 46 in a transition section shown between the large and smaller diameter portions of the regenerator. It is contemplated achieving substantially complete or incomplete CO burn in the regeneration section 48 as desired.

The suspension of hot solid particles and combustion product gases at a temperature within the range of 1200° to 1600° F. are passed upwardly through riser section 48 for discharge therefrom through a plurality of confined open end passageways 50 extending radially outward beneath the capped upper end of riser section 48. Passageways 50 are in open communication with cylinder 52 which is open in the bottom end portion thereof. The suspension passed through passageway 50 is charged tangentially to cylinder 52 to effect centrifugal separation of the charged suspension whereby a relatively compact mass of solids is formed at the wall of the cylinder with the combustion product flue gases of lower momentum being collected in a central portion of the cylinder for rapid removal to a lower pressure zone by conduit 54 in the bottom end thereof and coaxially aligned within cylinder 52. Regenerated solids separated from flue gases as above provided settle out by gravity and hindered settling with the collecting vessel counter current to upflowing gaseous material provided as discussed below. The flue gases separated as above provided are withdrawn by conduit 54 and conveyed to cyclone separating means 56 provided with dipleg 58 for returning cyclone separated fines to vessel or zone 64 about the upper end of riser 48 and the separating means attached thereto. Flue gases separated from fines in cyclone 56 are withdrawn by conduit 60 and 62. The flue gas may be rich in CO or $CO_2$ depending on the regeneration conditions employed. Separated flue gases may be used for generating steam and/or used in power recovery equipment.

The hot regenerated solids at a temperature in the range of 1300° to 1600° F. separated as above provided are collected as an annular bed of solids in a lower bottom portion of vessel 64 and maintained in a fluid like dense bed condition by the addition of gaseous material by conduit 66. This gaseous material may be non-combustion supporting gaseous material or it may comprise combustion supporting amounts of oxygen as desired.

The hot regenerated solids are withdrawn from the bottom portion of vessel 64 by conduit 68 for passage to an external stripping zone 70. The regenerated solids may be stripped as by passing downwardly through zone 70 counter current to stripping gas charged by conduit 72. Stripped gaseous material is conveyed by conduit 74 for discharge in vessel 64 and recovery as above discussed with regeneration combustion gas product. In stripping zone 70 some cooling of the regenerated catalyst may be accomplished directly if desired with the gas charged by conduit 72 or indirectly by means not shown. The stripped regenerated catalyst is then recycled by conduits 44 and 4 as above discussed.

Numerous variations may be made to the apparatus of FIG. I which include (1) placing cyclone 22 within vessel 20 and cyclone 56 within vessel 64, (2) an external stripper may be used alone or in conjunction with annular stripping zone 30, (3) hot regenerated solids may be recycled from the bottom of zone 64 directly to the lower portion of zone 38 without passing through stripper 70 and (4) a riser mix zone for spent solids, regenerated solids and combustion supporting oxygen containing gas may be provided which discharges upflow into a bottom portion of zone 38. It is also contemplated modifying riser 2 to be of smaller diameter in a lower portion than an upper portion thereof and charging hydrocarbon feed thereto in the transition section between the larger and smaller diameter sections of the riser.

FIG. II identifies yet another variation of apparatus arrangement which may be adapted to the riser arrangements discussed above with respect to FIG. I. That is, the upper end of riser 76 is shown passing coaxially upwardly through a larger diameter chamber referred to as a disengaging and/or collection vessel. The disengaging vessel is of larger diameter in an upper portion 78 than a lower portion 80 providing an annular zone resembling a stripping zone. In this arrangement, a suspension passed upwardly through riser 76 is discharged from beneath the capped upper end thereof through a plurality of confined radiating passageways 82 sloping downwardly and in open communication with cylindrical means 84 on the outer end and open in the bottom end thereof. The downwardly sloping passageway communicate generally tangentially with the cylinder means 84 above discussed. Centrifugally separated solids from entraining gasiform material form a relatively compact mass of solid on the wall of the cylindrical zone and separated from gasiform material collected in a central portion of the cylinder for withdrawal by conduit 86 open in the bottom end thereof and coaxially aligned within cylinder 84. The separated gasiform material, whether hydrocarbon vapors or combustion product flue gases withdrawn by conduit 86 pass to a cyclone separation zone 88 shown positioned within vessel portion 78. However, cyclone 88 may be external to zone or vessel 78 and may be the first of two stages thereof. Cyclone separated fines are withdrawn by dipleg 90, gasiform material separated by cyclone 88 entrained fines is recovered by a conduit communicating with plenum chamber 92 and withdrawal conduit 94.

Centrifugally separated solids pass downwardly from the bottom open end of cylinder 84 into the lower section 80 of the disengaging vessel which may or may not contain baffles as shown to affect stripping of the solids from entrained gasiform material such as product oil vapor or gaseous products of combustion. A stripping or fluffing gas such as a fluidizing gas is charged to a lower portion of section 80 by conduit 96. Solids are recovered from a bottom portion of section 80 by conduit 98 for transfer to another contact zone of choice such as the regeneration operation of FIG. I or the hydrocarbon conversion operation of FIG. I.

FIG. III is a top view of the separation means discussed with respect to FIGS. I and II. In order to simplify this discussion the numerals employed with FIG. II are identified on FIG. III. That is, the central circle corresponds to riser 76 and the satallite circles correspond to cylinder 84 of FIG. II. Connecting passageways 82 connect the riser 76 with the satellite cylinders 84. The purpose of FIG. III is to convey the use of curved passageways 82 which communicate tangentially with cylinders 84. However, the passageways may be straight rather than curved. Thus, it is contemplated by this invention of using curved or straight passageways which are either generally horizontal or sloping upwardly or downward slightly. In yet another aspect it is contemplated employing more than three cylinder separating means connected to the riser as shown in FIG. III. For example there may be four or more of such combinations to achieve the separation desired.

Having thus generally described the method and means of this invention and use thereof, it is to be understood that no undue restrictions are to be imposed by reason thereof except as defined by the following claims.

What is claimed is:

1. In a processing combination of hydrocarbon conversion in the presence of fluidizable solid particle material and regeneration of solid particle material to remove carbonaceous deposits by combustion wherein a riser zone is employed to pass a suspension of solids in gasiform material upwardly through the riser the improvements which comprises, passing a suspension of fluidizable solids in gasiform material radially outward from a riser contact zone by a confined open end passageway communicating with a cylinderical zone open in the bottom on the outer end thereof, said confined passageway communicating tangentially with said cylindrical zone whereby a suspension of solids in gasiform material is separated by centrifugal momentum differential within said cylindrical zone to form a compact centrifugal flowing mass of solids separated from gasiform material collected in a central portion of said cylindrical zone, discharging said compact flowing mass of solids from the open bottom of said cylindrical zone in counter current contact with upwardly flowing stripping gas passing upwardly into the bottom portion of said cylindrical zone and, withdrawing gasiform material upwardly from within said cylindrical zone separated from particle material for recovery as products of the separation combination.

2. The method of claim 1 wherein separation of the suspension is associated with that recovered from the riser section of a regeneration zone.

3. The method of claim 1 wherein separation of the suspension is associated with that recovered from the riser section of a hydrocarbon conversion zone.

4. The method of claim 1 wherein the suspension separated is a product of visbreaking obtained with relatively inert solid particle material.

5. The method of claim 1 wherein the confined passageway is horizontally curved to initiate centrifugal separation of the suspension passed therethrough.

6. The method of claim 1 wherein the radiating confined passageway slopes generally upward or downward prior to tangential communication with said cylindrical zone.

7. The method of claim 1 wherein the confined passageway is one of cylindrical, rectangular, square or obround cross section.

8. The method of claim 7 wherein the confined passageway is curved and generally sloping downward before attachment to said cylindrical zone.

9. A method for separating a suspension of solids in gasiform material upon discharge from a riser transport zone which comprises, passing the suspension radially outwardly from said riser zone through a plurality of separate confined passageway communicating with a cylindrical zone on the outer end thereof, said cylindrical zone open in a bottom portion thereof and tangentially attached to said confined passageway, said confined passageways and cylindrical zones confined within a larger diameter solids collection zone, centrifugally separating the suspension in said cylindrical zone and withdrawing separated gasiform material upwardly from within a central portion thereof by a gasiform material withdrawal passageway of lower pressure communicating with a downstream cyclone separation zone, separating entrained fines from gasiform material in said cyclone separation zone, discharging separated solids from the bottom of said cylindrical zone counter current to gasiform material passing into a central portion of said cylindrical zone for withdrawal therefrom, and collecting solids in a lower portion of said collection zone.

10. The method of claim 9 wherein the gasiform material passed into said cylindrical zone is a product of stripping said separated solids in a stripping zone in open communication with a lower portion of said collection zone.

11. The method of claim 10 wherein the riser zone is a hydrocarbon conversion zone, the solids are catalyst particles comprising a crystalline zeolite component and the catalyst particles are initially stripped with a gaseous material of lower temperature than a second stage of stripping with gaseous material of higher temperature.

12. The method of claim 11 wherein the gaseous products of the two stage stripping are combined and passed upwardly into the bottom portion of the cylindrical zone for removal with centrifugally separated hydrocarbon vaporous products of hydrocarbon conversion.

13. The method of claim 12 wherein the cyclone separation zone is located within or outside said collection zone.

14. The method of claim 9 wherein the suspension separation sequence is associated with the downstream end of a riser regeneration zone and centrifugally separated solids discharged from the bottom of said cylindrical zone are collected, stripped and recycled to each of an initial phase of the regeneration operation and a hydrocarbon conversion riser zone.

* * * * *